United States Patent Office 3,486,327
Patented Dec. 30, 1969

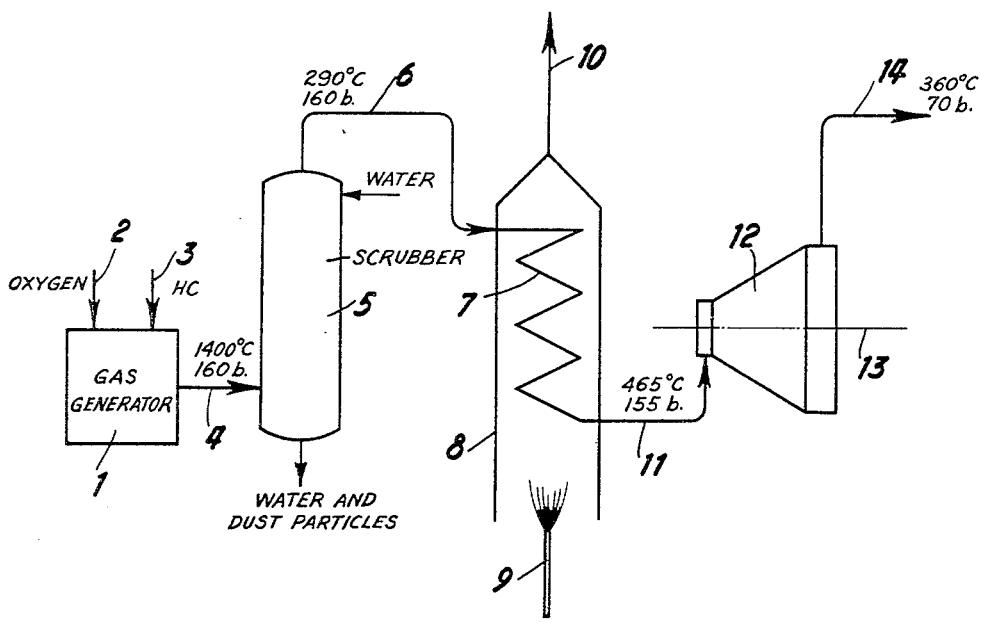
| LINE | MATERIALS |
|---|---|
| 4 — | $H_2, CO, CO_2, CH_4, H_2O$, A, CARBON BLACK |
| 6 — | $H_2, CO, CO_2, CH_4, H_2O$, A |
| 11 — | SAME AS (6) |
| 14 — | SAME AS (6) |
Inventors
François Xavier Poincet
Henri Marie René Pourcher
Philippe André Jourdain
By Hammond and Littell
Attorneys

3,486,327
PROCESS FOR TREATING GASEOUS MIXTURES
Francois Xavier Poincet, Paris, Henri Marie Rene Pourcher, Evry, and Philippe Andre Jourdain, Velizy, France, assignors to Societe Anonyme: Societe Technique d'Entreprises Chimiques, a corporation of France
Filed July 28, 1967, Ser. No. 656,918
Claims priority, application France, July 30, 1966, 71,578
Int. Cl. F02g *3/00*; C07c *1/02*
U.S. Cl. 60—39.02          7 Claims

ABSTRACT OF THE DISCLOSURE

The process consists essentially of cooling gases issuing from a reactor in which oxidation of hydrocarbons is carried out, preferably by simultaneously freeing them from the particles of free carbon they contain; reheating the gases thus obtained to a temperature of 1,000° C. at the most; and of introducing the gases so reheated into a recovery or expansion turbine which provides upon discharge a gaseous mixture at lower temperatures and pressures suitable for the requirements of synthesis.

---

The object of the invention is a process for treating gaseous mixtures obtained by partial oxidation of hydrocarbons used in the liquid or gaseous form and required for such operations as conversion, purification, synthesis and the feeding of fuel cells. It is known that the gaseous mixtures so obtained can be used with advantage in the synthesis of ammonia or methanol or alcohols by the process of hydroformylation (oxo alcohol), as they contain essentially carbn monoxide and hydrogen and can thus be used to provide hydrogen in a catalytic synthesis of ammonia from nitrogen and hydrogen, or hydrogen and carbon monoxide for the synthesis of methanol or that of the oxo alcohols. Furthermore, these gaseous mixtures can be used for feeding high-power fuel cells which utilize the reaction of oxygen and hydrogen or oxygen and carbon monoxide.

The apparatus in use at present operated by partial oxidation of a liquid, gasified or even gaseous hydrocarbon feed, provide gases at pressure at high temperatures, but these conditions are unfavorable for introducing these gases directly into conversion, purification and/or catalytic synthesis plants. Intermediate treatment of these gases is therefore necessary.

French Patent No. 1,107,463 describes a process for the production of carbon monoxide and hydrogen by partial combustion of a fluid hydrocarbon with a gas containing oxygen, which consists of introducing the hydrocarbon and the gas containing oxygen into the combustion zone of a gas turbine at a pressure substantially higher than atmospheric pressure; carrying out the reaction between hydrocarbon and oxygen in the combustion zone at the aforesaid pressure in exothermic conditions suitable to maintain the temperature in this reaction zone in the range of at least 1,100° C. and in relative proportions by which a gaseous current consisting mainly of hydrogen and carbon monoxide is obtained at this high reaction temperature; immediately afterwards reducing the temperature of said high temperature gaseous current by expansion and by cooling this current in the gas turbine to obtain a gaseous product which contains substantially no free carbon. Such a process, therefore, makes use of a gas turbine and, on the intake side, directly associating it with a generator of combustion gas, the combustion zone of the said turbine being fed by a gaseous mixture at high pressure and at temperatures at least equal to 1,100° C. Such operational conditions of the turbine pose serious technological problems.

The object of the invention is a process for treating gaseous mixtures of the type specified hereinabove which is easy to use and provides favorable overall thermal characteristics.

The process of the invention, which utilizes a gas generator supplied with hydrocarbons and oxygen-containing gas, as well as a turbine separated from said generator, consists essentailly of cooling the gases issuing from the generator, particularly while freeing them from the particles of free carbon they contain; reheating the gases so obtained to a temperature equal to 1,000° C. at the most; and introducing the gases thus reheated into a recovery or expansion turbine which provides upon discharge a gaseous mixture at lower temperature and pressure suitable for purification and/or synthesis.

The invention utilizes a gas generator of any type in which combustion of at least one hydrocarbon is carried out in the presence of an oxygen-containing gas, and advantageously, pure oxygen. It should be emphasized that such a generator is totally independent of the turbine use during a consecutive stage of gas treatment.

Gases can be cooled in various ways at the outlet from the generator. They can be passed into a boiler, which permits of the available energy in the gases being recovered, in the form of vapour for instance. According to a preferred form of cooling, the gases can be passed into a water bubbling apparatus, wherein the gases undergo soaking and leave behind the unburnt particles of carbon and at the same time become saturated with steam. Cooling can also be carried out by injecting a limited amount of water into an apparatus in which gases from the generator circulate. These various methods are part of the known technique for cooling gases. The amount by which it is necessary to cool the gases depends on the generator and turbine used and the requirements of the conversion, purification and/or synthesis operations for which the gases are intended after treatment. Generally speaking, when the treated gases are used for catalytic synthesis of ammonia, and as they leave the generator at temperatures higher than 1,100° C., cooling of gases to temperatures in the ranges of 320° C. to 400° C. should be provided for.

In a consecutive stage of the process of the invention the gases are reheated to a temperature lower than 1,000° C. before being directly introduced into the intake side of an expansion turbine. This reheating can be carried out advantageously by means of a flame superheater, that is, an apparatus comprising a burner the flame of which comes into contact with the conduits in which the gases to be reheated circulate.

The reheating temperature of the gases depends, of course, on the characteristics of the expansion turbine which is installed at the outlet of the reheating device. Generally speaking, if the gases issue from the cooling stage at a temperature in the range of between 200° C. and 450° C. they are reheated to between 500° C. and 700° C.

The reheated gases then pass into a recovery turbine where they undergo expansion and which they leave at a lower temperature. If this temperature is suitable for the subsequent utilization for which they are intended, the gases can be used directly at the outlet of the turbine. The exhaust gases, which consist essentially of carbon monoxide and hydrogen, can subsequently be treated in a conventional manner by chemical methods to provide synthesis gases. For the synthesis of ammonia, for example, the gaseous mixture of carbon monoxide and hydrogen issuing from the turbine can be treated by converting the carbon monoxide by catalysis in the presence of steam into carbon dioxide and hydrogen.

As a variant, if the temperature of the gases issuing from the turbine is insufficient to permit their being passed directly to conversion, they can be passed in a known manner into a heat exchanger heated, for instance, by the gases issuing from conversion.

The power recovered on the output shaft of the turbine can be used in any suitable manner to produce electricity and/or drive a machine, such as a compressor. This compressor can be the air compressor of the liquefaction plant supplying the necessary oxygen to the generator or the compressor of the synthesis gases.

The overall thermal characteristics realized in the process of the invention is favorable.

It may appear unprofitable to cool the gases and to reheat them afterwards. But this cooling of the gases will produce steam, either indirectly by a recovery boiler placed on the gases, or directly by the "soaking" operation. Apart from the fact that this amount of steam will be chemically necessary to continue the operations of preparing the final gas of the synthesis, it enables the energetic cycle to be brought to bear on a larger mass and so reduce temperature variations, which is always technologically advantageous.

It is also known that, to the extent that the acceptable fall in pressure makes it possible, there is always a very efficient conversion of heat into energy when superheating is carried out before expansion.

An example of embodiment of the process of the invention is described hereinafter by way of explanation and not in any limitative sense, with reference to the appended drawing which represents diagrammatically a plant permitting the process to be realised.

In the drawing reference 1 designates a gas generator fed at 2 with oxygen and at 3 with a hydrocarbon. The gases issuing from the generator at 4 and then passing into a bubbling column 5, wherein they undergo "soaking" with water and cool down, becoming saturated with steam while leaving behind the particles of unburnt carbon they contain. As an example, in a plant finally adapted for the production of 600 t/j $NH_3$ and if operating at a pressure of 160 bars, the saturated gases issue from the "soaking" column 5 at a temperature of 290° C. and consist of:

| | $Nm.^3/h.$ |
|---|---|
| Dry gases | 58,998 |
| Steam | 96,594 |
| Total | 155,592 |

These gases are introduced by conduit 6 into a flame superheater 8, where they circulate at 7 in contact with the flame of a burner 9, the exhaust gases of which are exhausted at 10. At the outlet of the flame superheater the gases are, for instance, at a temperature of 465° C.

They are then passed by a conduit 11 to an expansion turbine 12 where their pressure is lowered to 70 bars while their temperature drops to 360° C., leaving an available power of 6,850 kw. on shaft 13 of the turbine.

The exhaust gases at 14 can thus be at a temperature of 360° C., corresponding to the temperature at which the gas should enter the first layer of the carbon monoxide conversion catalyst, which makes it unnecessary to dispose an exchanger at the input to conversion.

As a variant, it may be preferable in certain cases to further expand the gases in turbine 12, in order to recover more power on shaft 13, in which case the temperature of the gases in 14 can drop to 250° C., for instance. It is then enough to pass these gases into a heat exchanger before causing them to enter the carbon monoxide conversion column to raise them from 250° C. to 320–380° C., which is the requisite temperature for the gases to enter the first layer of the catalyst. The heat exchanger is heated by the conversion gases which issue from the conversion column at about 420° C. These gases, upon contact with the gases to be reheated, cool down to 310° C., for instance.

What we claim is:

1. Process for treating of an initially hot gaseous mixture emanating from hydrocarbon oxidation consisting essentially of
   (a) passing said initial gaseous mixture through a cooling tower to cool and saturate with steam the gaseous mixture and to remove carbon particles therefrom;
   (b) re-heating said cooled gaseous mixture to a temperature of up to 1000° C., thus providing a clean reheated gaseous mixture;
   (c) introducing said re-heated gaseous mixture into the intake of an expansion turbine to cool said gaseous mixture to a desired temperature; and
   (d) recovering said cooled gaseous mixture from said turbine.

2. In step (a) of the process of claim 1 wherein said cooling tower is fed with a stream of water passing countercurrently to passage of said gaseous mixture.

3. Process of claim 1 wherein said re-heating step is accomplished by passing said cooled gaseous mixture through heated conduits.

4. Process of claim 1 including the step of utilizing gaseous mixture issuing from said turbine in another process without further treatment of said gaseous mixture.

5. Process of claim 4 including the step of
   re-heating, in an exchanger, said gaseous mixture from said turbine before being utilized in another process.

6. Process of claim 1 wherein said initial gaseous mixture is at a temperature of up to 1100° C. and wherein said initial gaseous mixture is cooled in said cooling tower to a temperature of 200–450° C.

7. Process of claim 6 wherein said cooled gaseous mixture is re-heated to a temperature of 500–700° C.

References Cited

UNITED STATES PATENTS

| 2,423,527 | 7/1947 | Steinschlaeger | 196—67 |
| 2,660,521 | 11/1953 | Teichmann | 252—373 X |
| 2,813,919 | 11/1957 | Pearce | 252—376 X |
| 2,865,864 | 12/1958 | Eastman et al. | 252—376 X |
| 3,324,654 | 6/1967 | Squires | 60—39.02 |

KENNETH W. SPRAGUE, Primary Examiner

U.S. Cl. X.R.

252—373